United States Patent Office 3,552,977
Patented Jan. 5, 1971

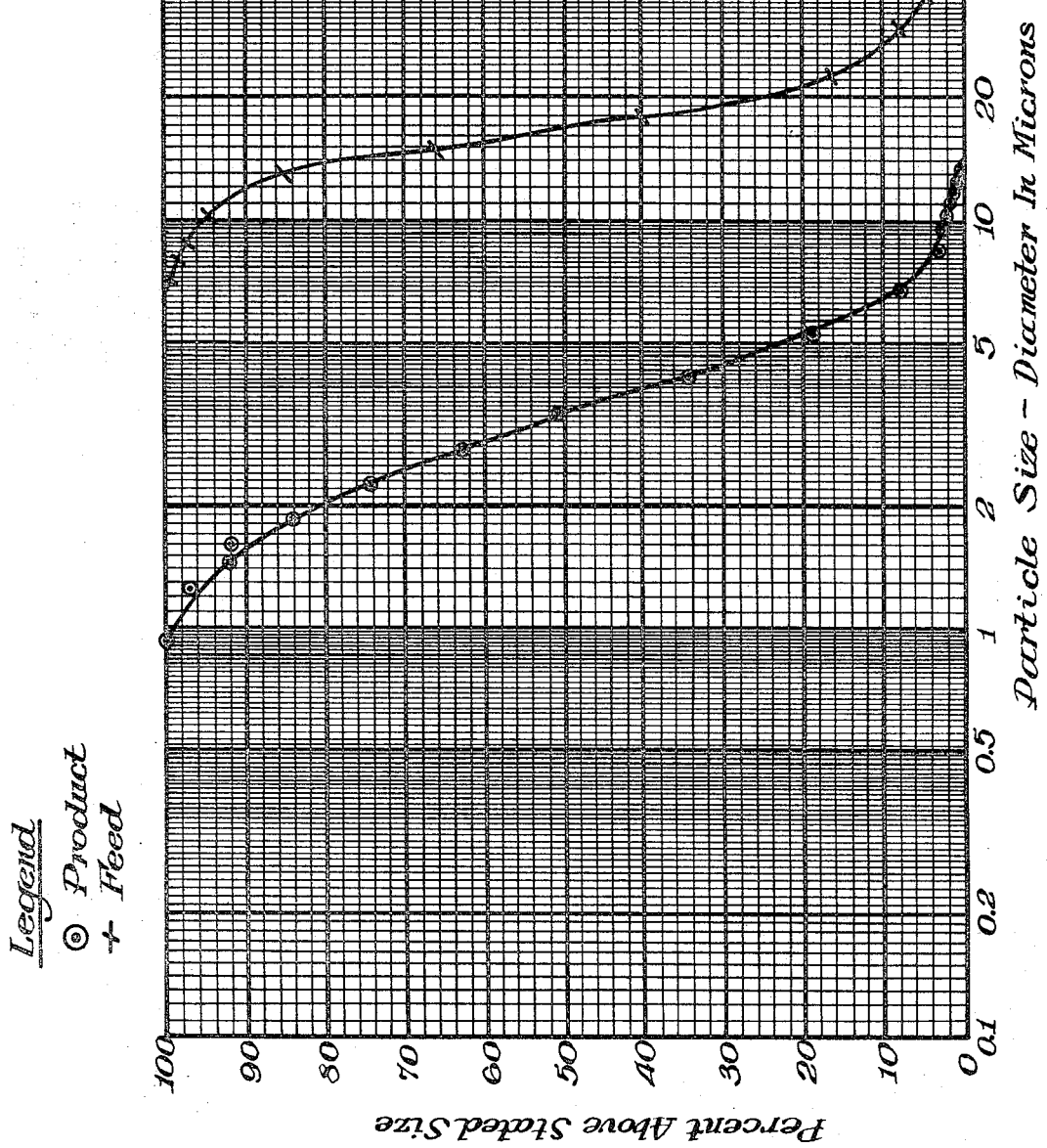

3,552,977
MICROCRYSTALLINE STEARYL FUMARIC COMPOUNDS AS BREAD SOFTENERS AND DOUGH IMPROVERS
Edward F. Bouchard, Northport, and Carl P. Hetzel, Bellrose, N.Y., assignors to Chas. Pfizer & Co., Inc., New York, N.Y., a corporation of Delaware
Continuation-in-part of application Ser. No. 508,527, Nov. 18, 1965. This application Sept. 27, 1966, Ser. No. 582,240
Int. Cl. A21d 2/16
U.S. Cl. 99—91                                   10 Claims

ABSTRACT OF THE DISCLOSURE

Microcrystalline monostearyl fumaric acid and certain of its metal salts are incorporated in yeast-leavened doughs prior to baking, in order to improve the shelf life of the baked goods.

---

The present application is in part a continuation of copending application Ser. No. 508,527, filed Nov. 18, 1965, now abandoned.

The invention relates to certain compositions and methods for improving the texture, antistaling properties and overall shelf life of yeast-leavened doughs and of baked goods made from such doughs, especially breads, rolls, cakes and doughnuts. It also concerns a novel microcrystalline form of monostearyl fumaric acid and of certain salts of this acid, especially the non-toxic alkali metals salts, sodium and potassium, and alkaline earth metal salts, calcium and magnesium, and processes for obtaining these microcrystalline products. It is these new forms of monostearyl furamic acid and its salts which are utilized as the bread stofteners and dough improves of this invention.

In recent years, a new and large industry has arisen in the preparation and sale of prepackaged baked goods. It has been particularly difficult to obtain bakery products, wherein the principal leavening agent is yeast, which remain soft and fresh-appearing when stored for any appreciable length of time. Doughmaking and baking have continued to be an art rather than an exact science. Besides variations in yeast and similar leavening agents, particularly critical are the variations in flour characteristics, not only between two types of flours but even between two batches of the same flour. Bakery products made from doughs from differnt flour batches thus have varied widely in grain, texture, resistance to firming or staling and general overall quality. A number of bread softeners and dough improvers have lately been developed, notably those described and claimed in the pending U.S. patent application, Ser. No. 391,080, filed Aug. 21, 1964 and issued Sept. 26, 1967, as U.S. Pat. 3,343,964. There the firming rate of baked leavened flour products and other bakery goods is retarded by incorporating in the doughs certain salts of monoalkyl fumarates and maleates, these salts being themselves generally known in the prior art but the use in doughs and baked goods being entirely new. Even with such compositions, the shelf life of the products is not nearly so long as the baking industry would like and the search for still better bread softeners continues.

It is an object of this invention to provide even more improved dough additives which even further lengthen the shelf life of yeast-leavened bakery products. Another object is to provide processes for making these improved additives. These and other objects are realized by the present invention which broadly comprises incorporating in the yeast-leavened dough prior to baking from about 0.1 percent to 2.0 percent, by weight of the flour content of the dough, of certain novel microcrystalline salts of monostearyl fumarate or of a new microcrystalline form of the free acid itself or of mixture of these. When this new form of monostearyl fumaric acid or its metal salt is substituted in yeast-leavened dough on an equivalent weight basis for the conventional macrocrystalline or amorphous forms of the same acid or salt, the shelf life of the bakery product, e.g. bread or rolls or cakes, thereafter made from the dough, is increased by as much as two days. Alternatively, and also, of course, extremely important in such a cost-conscious industry, to obtain essentially the same shelf life of the ultimate bakery product as is obtained for instance with the forms of monostearyl fumarate salt taught in the aforesaid application Ser. No. 391,080, now U.S. Pat. No. 3,343,964 one may substitute for that salt in the dough as little as one-fourth by weight of the corresponding new microcrystalline fumarate.

The specific salts which are useful in the present invention are the sodium, potassium, calcium and magnesium salts of monostearyl fumarate, which have been greatly reduced in particle size either by dry-milling or by recrystallizing from hot fats and oils or from aqueous media the corresponding prior art macrocrystalline forms of these salts. The single form of the monostearyl fumaric acid which is useful is that which has been subdivided to a microcrystalline structure by means of dry-milling. For some reason, the technique of hot fat recrystallization is not effective to obtain a free acid product which is operable in the methods and compositions of the present invention, unless the process conditions are very carefully controlled, e.g., rapid chilling of a hot fat solution containing monostearyl fumarate will reduce the particle size of that particular compound under these conditions. Of course, monostearyl fumaric acid being quite insoluble in water, recrystallization from aqueous media is also generally not quite feasible in order to achieve the desired microcrystalline structure.

The conventional forms hitherto known of both the monostearyl fumaric acid and its alkali metal and alkaline earth metal salts have consisted of flat platelets or amorphous particles, substantially all of which have diameters of at least about 5 microns and 95 percent of which have diameters of at least about 10 microns. The products of the present invention, made from these prior art forms, have average calculated spherical diameters of at most about 7 microns, and preferably at most about 5 microns. The reasons why this marked differences in particle size results in such marked differences in the softening qualities of the fumarates are not presently understood; but the fact remains that the new microcrystalline forms, while retaining at least the same dough-improving properties as the macrocrystalline starting materials from which they are made, are most unexpectedly superior to the prior art forms in their ability to retard staling, i.e. to maintain bread softness.

The new products may be most economically obtained by dry-milling of the corresponding prior art monostearyl fumaric acid or its salt, using milling and classifying equipment well known to those skilled in the art, e.g. jet mills, ball mills, or other impact mills, pin mills, micronizers and the like. Preferably, a mill with a built-in classifier is employed, but altenratively the fines may be classified separately and the milling repeated until the requisite proportion of the fumarate reaches the requisite size. Especially useful are fluid energy mills like the Jet-O-Mizer, Raymond pulverizer-hammer mills, Alpine impact mills and Entoleter mills. The dry-milled monostearyl fumarate thus obtained generally has an average spherical diameter of only up to about 2.5 microns and often only about 1.5 to 2.0 microns.

Other processes specifically useful for obtaining the specified salts of monostearyl fumarate of the desired microcrystalline size and structure, but not for obtaining the half-acid ester per se as hereinbefore explained, embody recrystallization of the corresponding prior art fumarate from an aqueous system or from a molten fat or oil. According to this latter technique, conventional coarsely-sized sodium, potassium, calcium or magnesium monostearyl fumarate is dissolved in an edible oil or in a liquid fat system at an elevated temperature and then recrystallized from the solution by rapid cooling, while agitating to maintain a homogeneous dispersion of the forming microcrystalline fumarate salt in the lipid system. The resulting mass is then preferably used in its entirety to supply both the required shortening and the fumarate softening agent for a yeast-leavened dough, but alternatively the fat-coated finely divided fumarate may be recovered from the recrystallization system and used separately. In either case, of course, the oil or fat medium chosen should be edible or at least non-toxic and must be liquid at the temperatures employed to dissolve the fumarate.

According to preferred embodiments of this fat-recrystallization process, from about 5 percent to about 40 percent, and desirably say 15 to 25 percent, of the fumarate is used by weight of the lipoid medium, and the mixture is heated with good agitation to a temperature range of approximately 100° to 140° C. and preferably 115° to 130° C. to solubilize the fumarate. Particularly satisfactory lipids are conventional liquid shortenings, such as cottonseed oil, soy bean oil, safflower oil and corn oil, and low-melting solid shortenings, e.g. lard and hydrogenated vegetable shortenings. It will become obvious to those skilled in this art that the particular choices of fumarate and lipoid medium, their relative proportions, and the times and temperatures of heating them together are necessarily interdependent. Generally, a fairly low amount, say 20 percent, of an easily soluble macrocrystalline salt in a vegetable oil which is liquid even at room temperature, when heated with efficient stirring to only about 120° C., is solubilized almost instantaneously. When heating is then stopped, the mass should be cooled quickly to room temperature, with or without artificial cooling means as may be indicated, whereupon a creamy emulsion forms which is solid or semi-solid.

In its broader aspects, the aqueous recrystallization process comprises solubilizing the large particle size fumarate in the aqueous medium by heating to a temperature slightly below the boiling point of the medium. For instance, in water in an open vessel the temperature should be raised to about 90–95° C., but alternatively at superatmospheric pressure in a closed system, the aqueous medium may be heated to a higher temperature without boiling, of course. The solubility characteristics of the particular fumarates of this invention are unusual. For instance, sodium monostearyl fumarate is soluble in water at room temperature up to about 70° C. only to the extent of approximately 0.1 percent by weight. However, when the temperature reaches 70° C. or a little higher, the solubility of this salt increases sharply. At 90–95° C., solubility is about 20 percent. It is this unusual property which is utilized in the wet processes of the present invention to obtain the new microcrystalline form of the fumarates.

After the conventional fumarate has been thus solubilized in the aqueous system, the temperature of the resulting solution is rapidly decreased to at least 70° C., at which point the finely divided fumarate suddenly recrystallizes out in the desired ultra-fine particle size contemplated by the present invention. The rate at which the temperature of the solution is cooled is important in minimizing crystal growth. Generally, the temperature of the solution should be dropped at least one centigrade degree per minute and preferably two. Thus, when the fumarate has been solubilized in water in an open vessel at 90–95° C., the solution should be cooled to 70° C. in ten to fifteen minutes. The precipitate of microcrystalline fumarate thereby obtained can be separated from the aqueous system by means well known in the art, for instance, simple filtering and drying or merely spray-drying. The resulting dried mass may be agglomerated, of course, but rough-milling readily breaks up the agglomerates and the desired extremely finely-divided fumarate results.

A preferred "wet" method for preparing the novel microcrystalline product is a continuous one which comprises slurrying the prior art macrocrystalline or amorphous fumarate material in the aqueous medium, feeding the slurry through a heat exchanger, whereby it is heated rapidly to the solubilization, and holding it there perhaps one minute or so. Conventional heat exchangers, well known in the art, can of course be employed, for instance, a Votator with a manually or automatically operated back pressure valve. The feed is pumped through such a heat exchanger into a vacuum chamber where the water is flashed off until, as in the batch-wise process, the temperature of the mass rapidly drops to at least 70° C. If desired, this flash-cooling technique in a vacuum chamber may be employed to remove all of the water from the system, leaving the desired microcrystalline fumarate. Alternatively, the flash-cooling may remove only part of the water, perhaps dropping the temperature of the resulting slurry to between about 30 and 35° C., and thereafter the dry product may be recovered by known means, such as those hereinabove cited, e.g. filtering, drying and breaking up the agglomerates.

Especially preferred fumarate salts of this invention are sodium monostearyl fumarates having a surface area of at least about 1.5 square meters per gram and consisting of particles with an average size, as measured by means of a Fisher Sub-Sieve Sizer, of between about 1 and about 3.5 microns spherical diameter. These products are especially well prepared by comminuting the prior art coarsely-sized salt in an impact mill of the Alpine type, or else by the above-described continuous "wet" process. The finely divided products in turn lend themselves particularly well to incorporation in the yeast-leavened doughs of this invention. While up to about 2 percent by flour weight of this or the other products of the present invention may be incorporated in the doughs with resulting improvement in the shelf-life of the ultimate bakery products, best bread softening with least expense is generally achieved at a maximum fumarate content of 1.0 percent by flour weight. With specific regard to the sodium salt, the recommended proportion is about 0.5 percent by weight of the flour in the dough, since the U.S. Food and Drug Administration has authorized this amount in yeast-leavened doughs. Of course, lesser amounts of the new microcrystalline products can be employed, but the useful minimum to achieve appreciable softening is about 0.05 percent by flour weight.

As hereinbefore indicated, the novel compositions of this invention fined their peculiar utility in bakery products wherein the principal leavening agent is yeast. The most common of such products are, of course, white and dark breads, rolls and cakes. When the new additives are incorporated in the doughs from which these foods are then baked, the products are found to be greatly improved in shelf life and grain texture and to maintain desirable softness in the store and on the housewife's shelf much longer than yeast-leavened bakery products made with prior art fumarates or with any other softeners.

The following examples are given simply to illustrate this invention, but not in any way to limit its scope. The particle size data in these examples were obtained by standard means, employing the hereinbefore mentioned Fisher Sub-Sieve Sizer to obtain the average diameter of the particles in a given product, arbitrarily assuming the particles to be spherical, and in conjunction with a Coulter Counter to obtain the spread of particle sizes within the given fumarate. The Fisher machine is manufactured by the Fisher Scientific Company, New York, N.Y., and is designed to measure the size of solid particles within the 0.2–50 micron range, i.e. below the size ranges for which sieve measurements are adapted. The machine operates on the principle that particles in the path of a regulated air flow will impede that air flow in a way that is directly related to their size. This air permeability principle is described in detail in Industrial Engineering Chemistry, Analytical edition (1940), vol. 12, No. 8, pp. 479–482. From the average spherical diameter in microns obtained on the Fisher for a given fumarate, the surface area of that particular material is then easily calculated in terms of square meters per gram utilizing the following equation:

$$\frac{4\pi r^2}{\frac{4}{3}\pi r^3} \times \frac{cm.^3}{1.1 \text{ grams (sp. gr.)}} \times \frac{10,000\mu}{cm.} \times \frac{1 \text{ m.}^2}{10,000 \text{ cm}^2} = \frac{3}{r}$$

$$\times \frac{1}{1.1} = \frac{3}{(r)(1.1)}$$

($r$=the average radius of the particle, i.e. one-half of the given spherical diameter).

EXAMPLE I

A slurry was prepared of 200 pounds of sodium monostearyl fumarate in 200 gallons of cold water, resulting in a total volume of 275 gallons. The fumarate had the following particle size analysis:

Average diameter (Fisher): 10.8$\mu$
Surface area: 0.51 sq. m./g.
2% of the particles finer than 10.0$\mu$ diameter
5% of the particles finer than 13.5$\mu$ diameter
10% of the particles finer than 16.2$\mu$ diameter
20% of the particles finer than 21.0$\mu$ diameter
100% of the particles finer than 60.0$\mu$ diameter This surry was pumped continuously at the rate of 3 gallons per minute through a Votator 6 inches in diameter and 48 inches in length (6.3 square feet), equipped with a back pressure value and heated by steam. The slurry entered the Votator at room temperature (about 24° C.) and was discharged at about 103° C. and a pressure of about 25 p.s.i.g. The continuous stream of hot fumarate solution then discharged into a vacuum receiver, where it was flash-cooled to about 32° C. at a pressure of 29 in. (Hg). The desired microcrystalline sodium stearyl fumarate thus precipitated, changing the previous solution again to a slurry. This was filtered on a conventional 30-plate filter press (13 cu. ft., 210 sq. ft. area), twenty minutes filtration time being required including one recycle of the filtrate; vacuum-dried in a standard shelf dryer for 48 hours; and milled on a low-speed plate mill (¼ inch holes) to break up the agglomerates.

The resulting sodium stearyl fumarate had a particle size analysis as follows:

Average diameter (Fisher): 3.3$\mu$
Surface area: 1.65 sq. m./g.
2% of the particles finer than 1.2$\mu$ diameter
5% of the particles finer than 1.6$\mu$ diameter
10% of the particles finer than 1.8$\mu$ diameter
20% of the particles finer than 3.0$\mu$ diameter
100% of the particles finer than 15.0$\mu$ diameter This continuous process is repeated, simply replacing the feed slurry of large particle size sodium salt with a corresponding slurry of macrocrystalline calcium monostearyl fumarate, heating to the solubilization point of this salt and then flash-cooling to 40° C. The desired microcrystalline calcium monostearyl fumarate precipitates, which upon recovery is found to have a surface area more than three times that of the coarse starting material.

EXAMPLE II

Sodium monostearyl fumarate of a macrocrystalline nature, having coarse particle sizes, was passed through an Alpine impact mill. The ground material obtained in this manner was thereafter subject to the action of an Alpine classifier, the fines being separated out by the air stream in the classifier. Particle size data on the final product of the single mill pass were then found to be as follows:

Average diameter (Fisher): 2.20$\mu$
2% of the particles finer than 1.4$\mu$ diameter
5% of the particles finer than 1.75$\mu$ diameter
10% of the particles finer than 2.2$\mu$ diameter
20% of the particles finer than 2.8$\mu$ diameter
50% of the particles finer than 7.2$\mu$ diameter

EXAMPLE III

Sodium monostearyl fumarate, made according to the procedure described in Example V of the aforesaid U.S. patent application Ser. No. 391,080, was passed once through a Raymond vertical impact mill to obtain one of the preferred microcrystalline products of this invention. Particle size data on the starting material and the product were as follows.

| Feed: | Product |
|---|---|
| 15.0$\mu$ (average diameter—Fisher) | 4.8$\mu$ |
| 0.36 sq. m./g. (surface area) ___sq. m./g__ | 1.1 |
| 8.0$\mu$ (2% of the particles below) | 1.3$\mu$ |
| 11.0$\mu$ (5% of the particles below) | 1.6$\mu$ |
| 14.0$\mu$ (10% of the particles below) | 2.0$\mu$ |
| 17.0$\mu$ (20% of the particles below) | 3.0$\mu$ |
| 80.0$\mu$ (100% of the particles below) | 15.0$\mu$ |

EXAMPLE IV

Another prior art coarse sodium monostearyl fumarate was passed through an Alpine impact mill. The ground material obtained in this manner was then subjected to the action of an Alpine classifier, the fines being separated out by the air stream in the classifier. The coarse residue was thereafter recycled a second time through the same said Alpine milling and classifying system to give the desired final product. Particle size data of the initial feed material and the combined product of the two mill passes were as follows.

| Feed: | Product |
|---|---|
| 7.6$\mu$ (average diameter—Fisher) | 1.7$\mu$ |
| 0.72 sq. m./g. (surface area) ___sq. m./g.___ | 3.2 |
| 8.0$\mu$ (2% of the particles below) | 1.1$\mu$ |
| 10.0$\mu$ (5% of the particles below) | 1.3$\mu$ |
| 12.0$\mu$ (10% of the particles below) | 1.6$\mu$ |
| 14.0$\mu$ (20% of the particles below) | 2.0$\mu$ |
| 70.0$\mu$ (100% of the particles below) | 14.5$\mu$ |

The Coulter Counter curves for these two fumarates are shown in the accompanying drawing.

A coarse calcium monostearyl fumarate of about the same particle size analysis as the above feed is passed twice through a Jet-O-Mizer mill (made by the Fluid Energy Processing and Equipment Company, Philadelphia). The product has an average spherical diameter (Fisher) of about 1.1$\mu$, with substantially all of its particles no larger than about 14.5$\mu$, 10 percent of them no larger than about one micron and 2 percent of them no larger than about 0.75$\mu$.

EXAMPLE V

A series of fumarates prepared as shown in the above examples were tested as bread softeners by the following technique.

4-hour sponge: Grams
- Flour _____ 1120
- Water _____ 615
- Yeast _____ 40
- Dough conditioner [1] _____ 8

[1] Potassium bromate, 0.3%; ammonium chloride, 9.7%; calcium sulfate, 25%; sodium chloride, 10%; and starch, 55%.

These ingredients are added to the McDuffee bowl of a Hobart mixer in the order listed and mixed for one minute at No. 1 speed, using a 3-spindle fork. The bowl is then scraped down and the sponge again mixed for one minute at the No. 2 speed. The sponge is removed from the bowl at this point, placed in a polyethylene bag and allowed to ferment at room temperature (about 77° F.) for four hours.

To prepare the ultimate test bread dough, sponge so prepared is placed in a ten-quart stainless-steel Hobart mixing bowl and these other ingredients added:

Grams
- Flour _____ 480
- Water _____ 417
- Sugar (granulated) _____ 128
- Salt _____ 34
- Calcium propionate preservative _____ 2
- Milk powder _____ 48
- Lard _____ 40
- Bread softener _____ 8

This mixture is mixed on No. 1 speed for eight minutes. The resultant dough is then removed from the bowl, placed in a polyethylene bag and allowed to ferment for 25 minutes at room temperature (about 77° F.). It is then scaled into 1 lb. portions, at least 4 such portions being prepared for each test. The portions are rolled into small balls by hand in order to exclude large air bubbles and gas pockets. Each ball is then run through a sheeter twice, using a 5/16 inch setting for the first pass and 3/16 inch setting for the second. The sheeted dough is molded into a cylinder approximately as long as the pan in which it is to be baked, placed in a greased pan, transferred to a proof box and proofed (allowed to rise) for one hour at 120° F. and 85 percent relative humidity. The proofed dough is then baked at 430° F. for 25 minutes and the resulting bread allowed to cool for one hour.

All but one of the bread loaves obtained in this manner for each test are then packaged in polyethylene bags and stored either at room temperature or under refrigeration conditions for various lengths of time, usually from one day to a week, at the end of which time the staling rate is measured. Each of the unpackaged loaves, on the other hand, is sliced and its initial softness determined as a control.

The determination of staling for each loaf is made by a standard compression test. Two 1-inch thick slices of bread are cut from each loaf, one slice being taken from the center of the loaf and the other approximately one inch from the end. The compression test is performed with a standard penetrometer using a 1-inch diameter flat stainless steel disc in place of the usual vaseline cone. A 150 g. weight is used as the load on the end of the compression disc. The load is placed on the slice for a period of ten seconds, after which time the penetration is determined in millimeters. Three compressions are performed on each slice of bread, two in the bottom corners of the slice and the third at the top center. All data are recorded and the six values for each loaf are averaged.

In the following table, are the compression data obtained by this procedure, not only for various products of the above specific examples but also for similar products made according to the present invention and, by way of comparison, of course, for diverse prior art fumarates and other types of bread softeners as well.

| Softener Test Sample | Bread loaf specific vol., cc. per gm. | Average compressions tenths of millimeters) | | | | | | |
|---|---|---|---|---|---|---|---|---|
| | | initial | Refrigerated, 1 day | Room Temp., 2 days | Room temp., 3 days | Room temp., 4 days | Room temp., 5 days | Room temp., 6 days |
| Prior art fumarate (Ex. V of S.N. 391,080) | 5.48 | 75 | | | 61 | 51 | 42 | |
| Prior art calcium stearyl-2-lactylante | 5.60 | | 84 | | 80 | 59 | 48 | |
| Prior art "Atmul 500" (65%-35% mono and diglyceride mixture) | 5.84 | 185 | 85 | | | 54 | 41 | 34 |
| Na salt prod. of Example I | 5.71 | | 114 | | 98 | 89 | | 64 |
| Sodium stearyl fumarate—aqueous recrystallized (lab scale) | 5.92 | 186 | 107 | | | 75 | 62 | 52 |
| Sodium stearyl fumarate product of Example II | 5.41 | | 114 | | 96 | 83 | 69 | |
| Product of Example III | 5.70 | | 119 | | 100 | 85 | 76 | |
| Product of Example III (but only 4 grams put in the test dough) | 5.72 | | 110 | | 89 | 67 | 63 | |
| Product of Example III (but only 2 grams put in test dough) | 5.65 | | 87 | | 75 | 57 | 48 | |
| Sodium salt product of Example IV | 5.81 | | 119 | | 104 | 96 | | 70 |
| Sodium salt prepared as in Example IV | 5.51 | | | 111 | 97 | 83 | 69 | |
| Sodium salt prepared as in Example IV (but only 4 grams put in the test dough) | 5.51 | | | 98 | 80 | 69 | 55 | |
| Calcium salt-fluid energy mill product of Example IV | 5.40 | | | 112 | 95 | 82 | 71 | |

EXAMPLE VI

Monostearyl fumaric acid (MSF) was obtained having a melting point of 91–92° C. and consisting of coarse particles shaped like thin, flat platelets of widely varied size and averaging 13.2 microns in diameter with a total surface area of about 0.413 square meter per gram. This was subjected to two passes through a fluid energy mill until it had the following particle size analysis.

Average diameter (Fisher): 2.0μ
Surface area: 2.7 square meters per gram
50% of the particles between 3.5 and 4.5μ diameter
90% of the particles finer than 10μ diameter
100% of the particles finer than 15μ diameter On microscopic examination, these particles were found to be primarily fine needle-like crystals.

EXAMPLE VII

A series of microcrystalline sodium monostearyl fumarate products were prepared by recrystallization from hot fats and oils. In each instance, one part by weight of the ordinary coarse particle size fumarate salt was blended into five parts by weight of the oil or molten fat maintained at 120° C. on an electric hot stove. The salt is easily dispersed in the hot oil to give a good white creamy emulsion. On cooling, the fumarate reprecipitated as very fine particles and the entire system solidified to a homogeneous mass. This solid or semisolid product was suitable for incorporation in doughs "as is," thereby providing both the necessary shortening content for the baked goods and the desired antistaling agent additive as well.

In this manner, there were prepared fine particle size sodium monostearyl fumarates recrystallized, respectively, in lard (liquefied at the temperature employed, of course), in a cottonseed oil medium (available under the trademark name Wesson Oil), in a soy bean oil medium (trademarked Crisco Oil), in a corn oil medium (trademarked Mazola), and in a hydrogenated vegetable shortening (trademarked Covo).

By the same method but employing a dissolving temperature of 140° C., there was also prepared calcium monostearyl fumarate of comparable very fine particle size from prior art macrocrystalline material, using as the recrystallization media respectively, molten hydrogenated vegetable shortening ("Covo"), lard and cottonseed oil ("Wesson Oil").

EXAMPLE VIII

Using the procedure of Example V, the microcrystalline fumarate products of Examples VI and VII were tested as bread softeners. In this following table, are the resulting compression data obtained by this procedure as compared with various other bread softening agents:

| Softener Test Sample | Bread loaf specific volume, cc. per gm. | Average compressions (tenths of millimeters) | | | | |
|---|---|---|---|---|---|---|
| | | Refrigerated 1 day | Room temp., 3 days | Room temp., 4 days | Room temp., 5 days | Room temp., 7 days |
| Prior art MSF of Ex. VI | 5.79 | 82 | 64 | | 40 | 28 |
| Prior art Na Stearyl fumarate (Ex. V of S.N. 391,080) | 5.78 | 85 | 64 | | 38 | 27 |
| Do | 5.48 | 84 | 58 | 42 | 35 | |
| Na stearyl fumarate prod. of Ex. IV | 5.74 | 111 | 92 | | 63 | 51 |
| Do | 5.78 | 107 | 89 | 74 | 61 | |
| Milled MSF prod. of Ex. VI | 5.65 | 110 | 90 | | 62 | 52 |
| Do | 5.48 | 111 | 91 | | 62 | |
| Cottonseed oil-rex Na stearyl fumarate of Ex. VII | 5.57 | 109 | 93 | 73 | 64 | |
| Do | 5.75 | 122 | 98 | 80 | 96 | |
| Soybean oil—rex Na stearyl fumarate of Ex. VII | 5.54 | 108 | 92 | 73 | 64 | |
| Corn oil—rex Na stearyl fumarate of Ex. VII | 5.50 | 118 | 99 | 82 | 70 | |
| Cottonseed oil—rex Ca stearyl fumarate of Ex. VII | 5.55 | 106 | 79 | 63 | 58 | |
| Lard—rex Ca stearyl fumarate of Ex. VII | 5.45 | 100 | 76 | 63 | 56 | |
| Lard—rex Na stearyl fumarate of Ex. VII | 5.56 | 106 | 85 | 72 | 63 | |
| Hydr. veg. sh.—rex Ca stearyl fumarate of Ex. VII | 5.72 | 99 | 80 | 63 | 52 | |
| Hydr. veg. sh.—rex Na stearyl fumarate of Ex. VII | 5.73 | 104 | 88 | 72 | 59 | |

EXAMPLE IX

Sodium monostearyl fumarate is added to water in an open vessel to provide a slurry consisting of 1800 grams of the fumarate in 10 liters of water. The slurry is heated by means of a steam coil to 90° C., whereby essentially all of the fumarate is solubilized. The solution is then rapidly chilled in an ice bath to 70° C., at which point the desired finely-divided final product precipitates out. Chilling is continued to 45° C., the total cooling time elapsed from 90° C. to this temperature being 30 minutes. The resulting slurry is then filtered, the filter cake dried and de-agglomerated by rough-milling and the microcrystalline sodium monostearyl fumarate thus obtained is found to have particles with average spherical diameter sizes that are substantially all below $5\mu$. (The corresponding fumarate starting material particles are substantially all at least $5\mu$ in diameter and 95% of them are above $10\mu$.)

This same batch procedure is repeated using as the starting slurry 1500 grams of macrocrystalline potassium monostearyl fumarate in 10 liters of water. The particles constituting the prior art fumarate are substantially all at least $5\mu$ in diameter and 95% of them are above $10\mu$. The corresponding microcrystalline potassium salt thus obtained has average particle sizes (Fisher spherical diameters) which are substantially all below $5\mu$.

What is claimed is:

1. The method of improving the shelf life of yeast leavened bakery products, which comprises incorporating in the dough prior to baking an effective amount up to about 2.0% by flour weight of at least one fumarate of the group consisting of monostearyl fumaric acid and its sodium, potassium, calcium and magnesium salt, the said fumarate having a surface area of at least about one square meter per gram and consisting of particles having an average spherical diameter up to about five microns.

2. The method of claim 1 wherein the fumarate is sodium monostearyl fumarate and between about 0.1% and about 1.0% of it by flour weight is incorporated in the dough.

3. The method of claim 1 wherein the fumarate is the free half-acid ester, monostearyl fumarate itself, and between about 0.1% and about 1.0% of it by flour weight is incorporated in the dough.

4. The method of claim 1 wherein there is incorporated in the dough from about 0.05% to about 0.5% by flour weight of sodium monostearyl fumarate having a surface area of at least about 1.5 square meters per gram and consisting of particles having an average spherical diameter up to about 3.5 microns.

5. The method of claim 1 wherein there is incorporated in the dough from about 0.05% to about 0.5% by flour weight of monostearyl fumarate having a surface area of at least about 1.5 square meters per gram and consisting of particles having an average spherical diameter up to about 2.5 microns.

6. Yeast-leavened doughs containing an effective amount up to about 2.0% by flour weight of at least one fumarate of the group consisting of monostearyl fumaric acid and its sodium, potasium, calcium and magnesium salts, the said fumarate having a surface area of at least about one square meter per gram and consisting of particles having an average spherical diameter up to about five microns.

7. Bread dough containing between about 0.05% and about 0.5% by flour weight of sodium monostearyl fumarate having a surface area of at least about 1.5 square meters per gram and consisting of particles having an average spherical diameter up to about 3.5 microns.

8. Bread dough containing between about 0.05% and about 0.5% by flour weight of monostearyl fumarate having a surface area of at least about 1.5 square meters per gram and consisting of particles having an average spherical diameter up to about 2.5 microns.

9. The process of preparing a finely divided sodium, potassium, calcium or magnesium salt of monostearyl fumarate, having a surface area of at least about one square meter per gram and consisting of particles having an average spherical diameter up to about five microns, from the corresponding fumarate, consisting of particles substantially all of which are at least about 5 microns in diameter and 95% of which are at least about 10 microns in diameter, said process comprising solubilizing the starting material in an edible oil or liquefied fat at a temperature substantially between about 100° and 140° C. and cooling the resulting solution with agitation until the fumarate salt recrystallizes therefrom as a homogeneous dispersion in the oil matrix.

10. The method of improving the shelf life of yeast-leavened bakery products which comprises incorporating in the dough prior to baking, as the principal sources of both shortening and antistaling agent, the product of the process of claim 9, in an amount to provide between about 0.05% and about 2.0% by flour weight of the fumarate salt.

References Cited

UNITED STATES PATENTS 3,360,375   12/1967   Buddemeyer et al. _____ 99—91

RAYMOND N. JONES, Primary Examiner

J. R. HOFFMAN, Assistant Examiner

U.S. Cl. X.R.

99—86, 92; 260—485